United States Patent
Wurster et al.

(10) Patent No.: US 12,174,965 B2
(45) Date of Patent: Dec. 24, 2024

(54) IDENTIFYING APPLICATION PROGRAM INTERFACE USE IN A BINARY CODE

(71) Applicant: BlackBerry Limited, Waterloo (CA)

(72) Inventors: Glenn Daniel Wurster, Kitchener (CA); Andrew Chin, Burnaby (CA); Benjamin Gnahm, Augsburg (DE)

(73) Assignee: BlackBerry Limited, Waterloo (CA)

( * ) Notice: Subject to any disclaimer, the term of this patent is extended or adjusted under 35 U.S.C. 154(b) by 456 days.

(21) Appl. No.: 17/520,445

(22) Filed: Nov. 5, 2021

(65) Prior Publication Data

US 2023/0141142 A1 May 11, 2023

(51) Int. Cl.
| | |
|---|---|
| *G06F 21/57* | (2013.01) |
| *G06F 9/54* | (2006.01) |
| *G06F 21/56* | (2013.01) |
| *G06N 20/00* | (2019.01) |

(52) U.S. Cl.
CPC ............ *G06F 21/577* (2013.01); *G06F 9/542* (2013.01); *G06F 21/566* (2013.01); *G06N 20/00* (2019.01); *G06F 2221/034* (2013.01)

(58) Field of Classification Search
CPC .... G06F 11/3471; G06F 21/52; G06F 21/566; G06F 21/577; G06F 2221/034; G06F 8/36; G06F 8/75; G06F 8/77; G06F 9/542; G06N 20/00
See application file for complete search history.

(56) References Cited

U.S. PATENT DOCUMENTS

| | | | |
|---|---|---|---|
| 6,523,119 B2 * | 2/2003 | Pavlin | G06Q 20/0855 713/192 |
| 7,024,564 B2 * | 4/2006 | Pavlin | G06F 21/123 713/192 |

(Continued)

FOREIGN PATENT DOCUMENTS

EP  3572944  11/2019

OTHER PUBLICATIONS

Extended European Search Report in European Appln. No. 22194652.8, dated Mar. 7, 2023, 12 pages.

(Continued)

*Primary Examiner* — Sharon S Lynch
(74) *Attorney, Agent, or Firm* — Fish & Richardson P.C.

(57) ABSTRACT

Systems, methods, and software can be used to identify API use in a binary code. In some aspects, a method comprises: obtaining a base memory-write profile description for a binary code, wherein the description comprises: a base memory-write profile for each of a plurality of API calls in the binary code, wherein the base memory-write profile comprises a count of memory updates for each of a plurality of memory locations during an execution of a corresponding API call; receiving an execution request that invokes the binary code; generating an execution memory-write profile for the request, wherein the execution memory-write profile comprises a count of memory updates for each memory location during an execution of the request; determining, based on a comparison between the execution memory-write profile and the base memory-write profiles in the description, an API call corresponding to the request; and generating a notification indicating the determined API call.

17 Claims, 3 Drawing Sheets

(56) References Cited

U.S. PATENT DOCUMENTS

| | | | | |
|---|---|---|---|---|
| 7,711,988 | B2* | 5/2010 | Zhou | G06F 11/348 714/30 |
| 7,886,148 | B2* | 2/2011 | Kiriansky | G06F 21/554 726/17 |
| 8,307,435 | B1* | 11/2012 | Mann | G06F 21/566 717/124 |
| 8,782,435 | B1* | 7/2014 | Ghose | H04L 9/3247 712/216 |
| 8,955,111 | B2* | 2/2015 | Glew | G06F 21/552 726/25 |
| 8,966,312 | B1* | 2/2015 | Gupta | G06F 11/1469 714/21 |
| 9,027,000 | B2* | 5/2015 | Guerrera | G06F 11/3419 717/130 |
| 9,177,153 | B1* | 11/2015 | Perrig | G06F 21/57 |
| 9,361,102 | B2* | 6/2016 | Tan | G06F 8/42 |
| 9,552,285 | B2* | 1/2017 | Godefroid | G06F 11/3688 |
| 9,922,074 | B1* | 3/2018 | Hoffmann | G06F 16/275 |
| 10,037,429 | B1* | 7/2018 | Rodriguez Bravo | G06F 21/602 |
| 10,303,888 | B2* | 5/2019 | Rodriguez Bravo | G06F 21/6254 |
| 10,310,969 | B2* | 6/2019 | Bhattacharjee | G06F 8/71 |
| 10,445,495 | B2* | 10/2019 | Sharifi Mehr | G06F 21/52 |
| 10,509,906 | B2* | 12/2019 | Gupta | G06F 21/554 |
| 10,628,586 | B1* | 4/2020 | Jung | G06F 11/3037 |
| 10,678,907 | B2* | 6/2020 | Aditham | G06F 21/552 |
| 10,726,137 | B2* | 7/2020 | Rodriguez Bravo | G06F 21/6209 |
| 11,144,638 | B1* | 10/2021 | Golden | G06F 21/566 |
| 11,256,808 | B2* | 2/2022 | Jung | G06F 21/563 |
| 11,269,990 | B1* | 3/2022 | Aditham | G06F 21/52 |
| 11,349,864 | B2* | 5/2022 | Boulton | G06F 21/629 |
| 11,409,870 | B2* | 8/2022 | Gupta | G06F 9/485 |
| 11,562,071 | B2* | 1/2023 | Jung | G06F 11/3037 |
| 2001/0056539 | A1* | 12/2001 | Pavlin | G06F 21/123 713/193 |
| 2003/0110388 | A1* | 6/2003 | Pavlin | G06F 21/123 713/190 |
| 2007/0150599 | A1* | 6/2007 | Neogi | G06F 16/217 709/227 |
| 2009/0007077 | A1* | 1/2009 | Musuvathi | G06F 11/3688 717/130 |
| 2010/0011209 | A1* | 1/2010 | Kiriansky | G06F 21/53 713/166 |
| 2011/0072300 | A1* | 3/2011 | Rousseau | G06F 3/0619 711/E12.001 |
| 2011/0113405 | A1* | 5/2011 | Guerrera | G06F 11/3476 717/125 |
| 2012/0079596 | A1* | 3/2012 | Thomas | H04L 63/1433 726/24 |
| 2012/0084759 | A1* | 4/2012 | Candea | G06F 9/45504 717/134 |
| 2013/0081134 | A1* | 3/2013 | Glew | G06F 21/552 726/22 |
| 2015/0370560 | A1* | 12/2015 | Tan | G06F 21/54 717/148 |
| 2016/0253497 | A1* | 9/2016 | Christodorescu | G06F 21/566 726/23 |
| 2016/0328561 | A1* | 11/2016 | Tamir | G06F 21/552 |
| 2018/0211033 | A1* | 7/2018 | Aditham | G06F 21/52 |
| 2018/0322294 | A1* | 11/2018 | Rodriguez Bravo | G06F 21/602 |
| 2018/0322296 | A1* | 11/2018 | Rodriguez Bravo | G06F 21/602 |
| 2018/0322297 | A1* | 11/2018 | Rodriguez Bravo | G06F 21/10 |
| 2018/0349597 | A1* | 12/2018 | Sharifi Mehr | G06F 21/52 |
| 2019/0138725 | A1* | 5/2019 | Gupta | G06F 9/485 |
| 2019/0392724 | A1* | 12/2019 | Breed | G06V 40/19 |
| 2020/0177621 | A1* | 6/2020 | Boulton | H04L 63/1425 |
| 2020/0193034 | A1* | 6/2020 | Rodriguez Bravo | G06F 21/6218 |
| 2020/0201998 | A1* | 6/2020 | Jung | G06F 11/3037 |
| 2021/0312057 | A1* | 10/2021 | Kloth | G06F 3/0623 |
| 2021/0326171 | A1* | 10/2021 | Riesen | G06F 9/5038 |
| 2022/0027472 | A1* | 1/2022 | Golden | G06F 21/78 |
| 2022/0129554 | A1* | 4/2022 | Jung | G06F 21/566 |
| 2022/0283864 | A1* | 9/2022 | Kwon | G06F 11/3442 |
| 2023/0142345 | A1 | 5/2023 | Wurster et al. | |

OTHER PUBLICATIONS

U.S. Appl. No. 17/520,451, Wurster et al., filed Nov. 5, 2021.
Forrest et al., "A Sense of Self for Unix Processes" In proceedings of the 1996 IEEE Symposium on Security and Privacy, IEEE Computer Society Press, May 1996, 9 pages.
Extended European Search Report in European Appln. No. 22194659.3, mailed on Mar. 28, 2023, 6 pages.
Final Office Action in U.S. Appl. No. 17/520,451, mailed on May 8, 2024, 14 pages.
Manes et al., "Fuzzing: Art, Science, and Engineering" submitted on Dec. 1, 2018, arXiv: 1812.00140V1, 29 pages.
Non-Final Office Action in U.S. Appl. No. 17/520,451, mailed on Jan. 3, 2024, 15 pages.
Notice of Allowance in U.S. Appl. No. 17/520,451, mailed on Jul. 18, 2024, 9 pages.

* cited by examiner

IDENTIFYING APPLICATION PROGRAM INTERFACE USE IN A BINARY CODE

TECHNICAL FIELD

The present disclosure relates to identifying and tracking Application Program Interface (API) use in a binary code of software.

BACKGROUND

In some cases, software services can be provided by executable binary code. The binary code is computer software in a binary format. The computer software can be application software, system software (e.g., an operating system or a device driver), or a component thereof. The binary code can also be referred to as executable code.

DESCRIPTION OF DRAWINGS

Like reference numbers and designations in the various drawings indicate like elements.

DETAILED DESCRIPTION

In some cases, a binary code of software can be submitted to a software analysis platform. The software analysis platform can receive an execution request that invokes the binary code of the software and performs the execution of the binary code. The software analysis can identify API calls corresponding to the execution request, and further determine a risk level of the execution request.

The binary code of the software is submitted without source code. The binary code can include a stream of bytes that are generated by compiling the source code of the software. Thus, the binary code is not in a human readable format and cannot be easily parsed or analyzed. The binary code can include one or more APIs, with each API including one or more API calls. For example, calendars.PUT, calendars.GET, and calendars.POST are some examples of API calls of the same CalDAV API. In another example, sqlite3_open( ), sqlite3_prepare( ), and sqlite3_close( ) are some examples of API calls to the SQLite 3 API. In a third example, recursive, iterative, and non-recursive queries to a DNS server for AAAA, CNAME, and NS records are examples of API calls to the DNS server API. An API call can be invocation of a specific function included in the API. The API call may be invoked based on one or more parameters for the specific function. Without the source code of the binary code, it is difficult to know the list of API calls that can be invoked in the binary code. Furthermore, during the execution of the binary code, it is difficult to determine which API calls are executed, especially with APIs for which documentation is not available.

Techniques described herein provide a method to identify and track the API calls invoked during execution of the binary code, in response to an execution request. For example, an execution request may be received that includes a request to invoke a certain API call included in the binary code. Techniques described herein can monitor and determine a memory-write profile for the execution of the binary code. The determined memory-write profile is corresponding to the invoked API call. In other words, the determined memory-write profile indicates the profile of the memory write during the execution of the API call that is invoked by the execution request. Such a memory-write profile can be used to determine which API call is invoked by the execution request. Specifically, the determined memory-write profile can be compared with base memory-write profiles of a plurality of API calls. The base memory-write profiles are standard memory-write profiles for each of the plurality of API calls. If a match is found (e.g., the similarity satisfies a threshold), the invoked API call can be identified.

Figure 1:
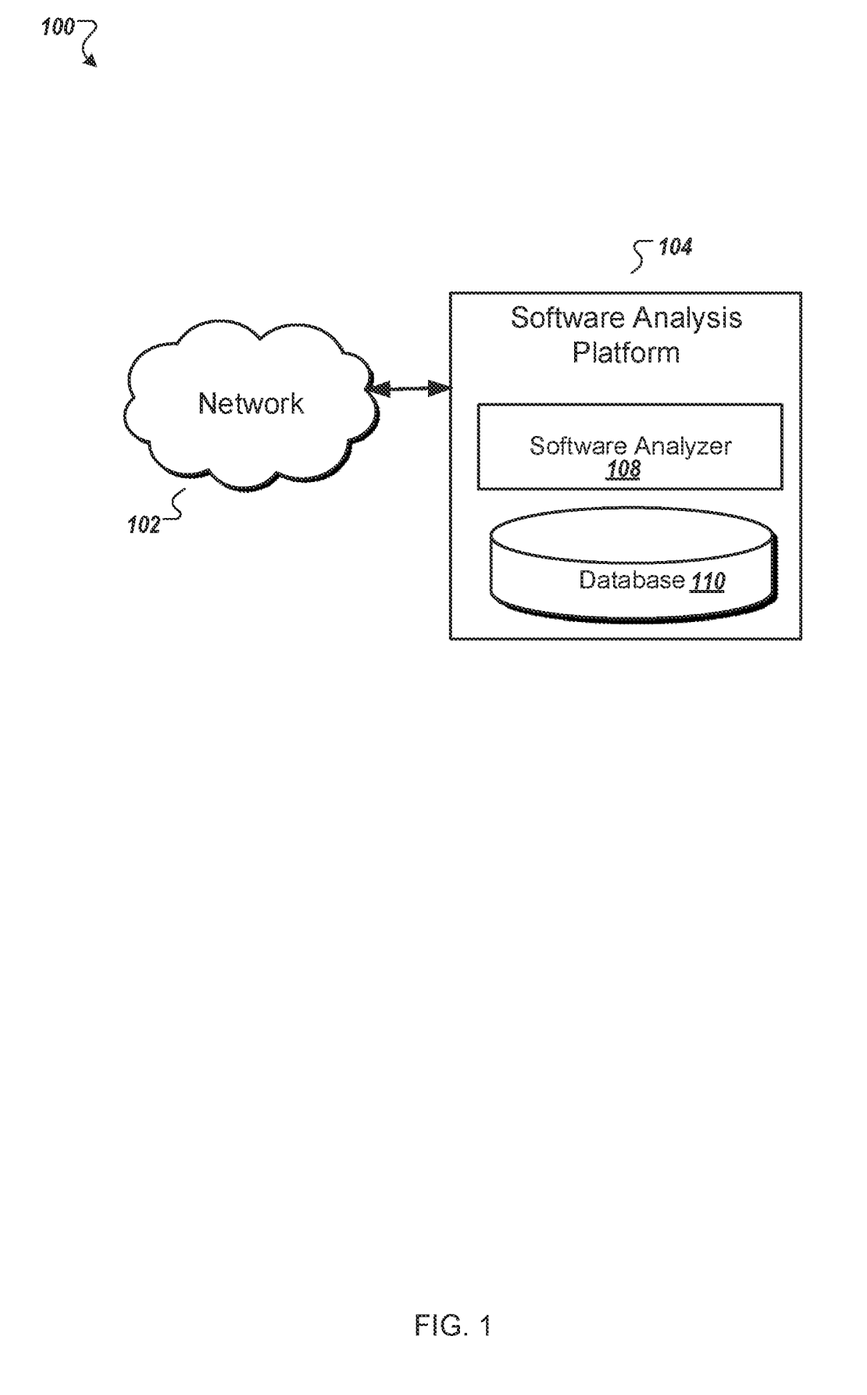
FIG. 1 is a schematic diagram showing an example communication system that provides data communications for identifying API use in a binary code, according to an implementation.
Figure 2:
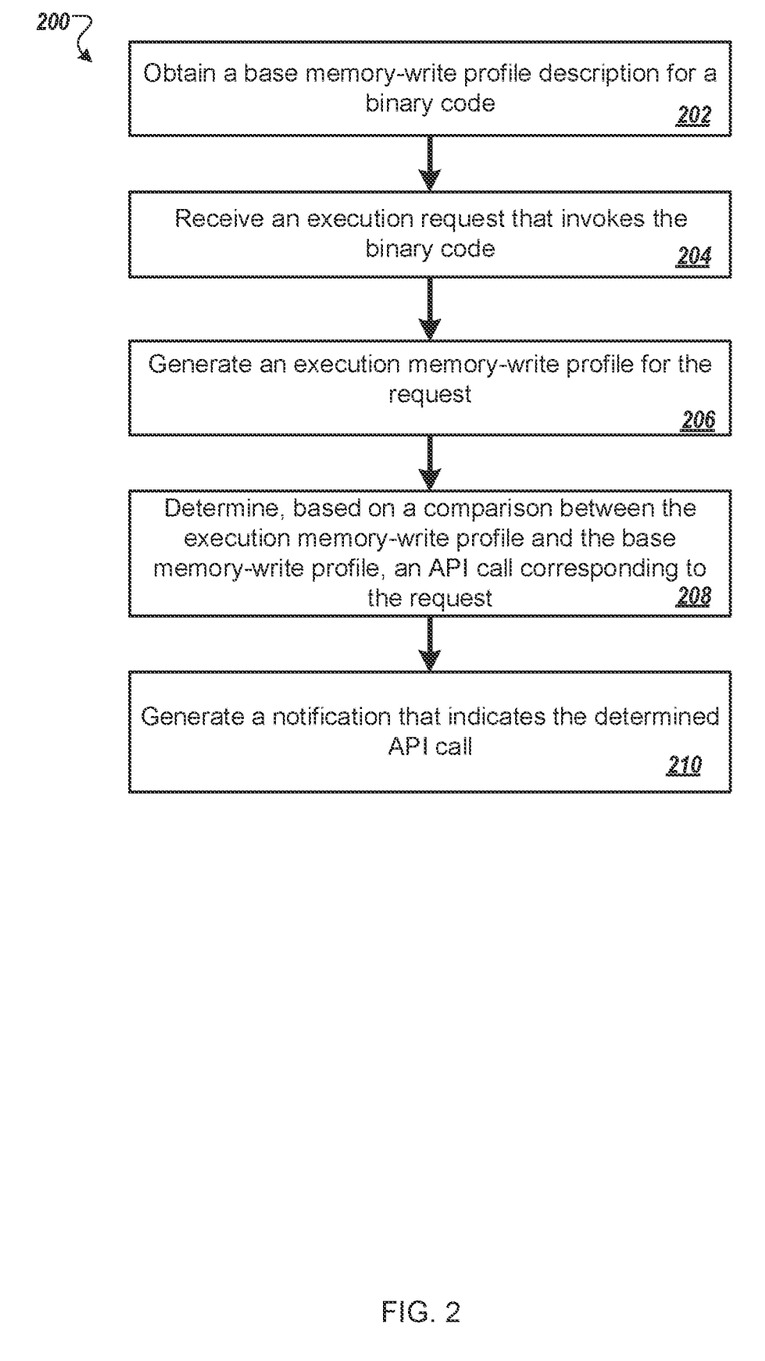
FIG. 2 is a flowchart showing an example method for classifying API calls in a binary code, according to an implementation.
Figure 3:
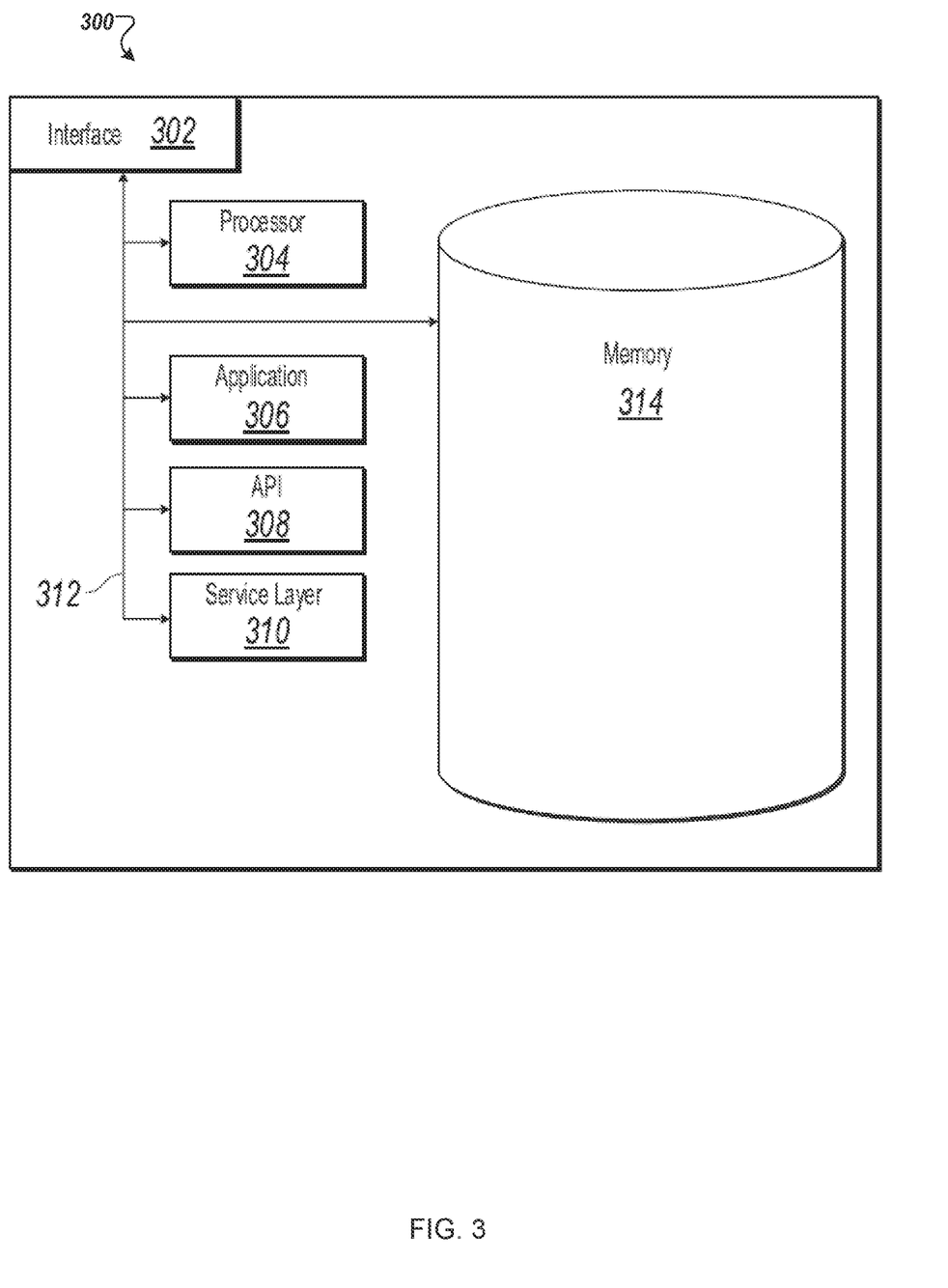
FIG. 3 is a high-level architecture block diagram of a server, according to an implementation.

Furthermore, the comparison result can indicate a risk level of the execution request. Specifically, if the memory-write profile of the API call invoked by the execution request is significantly different from the standard/base memory-write profile for that particular kind of API call, the risk level of the execution request is high. FIGS. 1-3 and associated descriptions provide additional details of these implementations.

Techniques described herein produce one or more technical effects. In some cases, the risk of an execution request to software can be determined without having the source code of the software available. The determined risk can be used to identify attacks and minimize the potential damage or harm caused by a risky execution request. Thus, the security and safety of the system that implements the binary code can be improved. Furthermore, the described techniques can identify the specific API calls invoked by the execution request, which provides a fine-grained analysis result and more detailed information regarding the execution request. Such information can be further used to design a more robust software system. In some cases, the additional detailed information regarding the invoked API calls can be used to design a system that can recognize attacks more accurately. Even if the execution request has caused damages, the identified API call can provide specific information that is helpful for locating the software vulnerability and associated damages, which can make the restoration of the system more efficient.

FIG. 1 is a schematic diagram showing an example system 100 for identifying API use in a binary code, according to an implementation. At a high level, the example system 100 includes a software analysis platform 104 that is communicatively coupled with a network 102.

The software analysis platform 104 can receive the binary code of software and identify API use in the binary code. The software analysis platform 104 can be a module located on the same device that is used for developing the software. The software analysis platform 104 can receive the binary code locally from another module of the same device. Alternatively or additionally, the software analysis platform can be a different device from the software developer machine that submits the binary code. The software analysis platform 104 can receive the binary code submitted by the software developer machine over the network 102. The software analysis platform 104 can be implemented in one or more servers, on a cloud-computing platform, or locally reside on the same computer as that being used to develop the software.

The software analysis platform 104 includes a software analyzer 108 and a database 110. The software analyzer 108 represents an application, a set of applications, software, software modules, hardware, or any combination thereof, that can be configured to identify and track API use in the binary code of software, in response to an execution request. For example, the software analyzer 108 can receive an execution request that invokes an API call included in the binary code. The software analyzer 108 can monitor and determine a memory-write profile for the execution of the binary code. The determined memory-write profile indicates the profile of the memory write during the execution of the API call that is invoked by the execution request. The software analyzer 108 can compare the determined memory-write profile with base memory-write profiles of a plurality of API calls. If a match is found (e.g., the similarity satisfies a threshold), the software analyzer 108 can identify the invoked API call as the API call with matching memory-write profile. Furthermore, software analyzer 108 can determine a risk level of the execution request based on the comparison result. For example, if the memory-write profile of the API call invoked by the execution request is significantly different from the standard/base memory-write profile for that particular kind of API call, the risk level of the execution request is high. FIGS. 2-3 and associated descriptions provide additional details of these implementations.

The database 110 represents an application, a set of applications, software, software modules, hardware, or any combination thereof, that can be configured to store a base memory-write profile description for the binary code. The base memory-write profile description includes a collection of base memory-write profiles for each of a plurality of API calls in the binary code. In addition, the database 110 can be configured to store execution requests, execution memory-write profiles generated for the execution requests, comparison results between the execution memory-wrote profiles and the base memory-write profiles, risk level of each execution request, notifications indicating the identified API calls, and any other relevant information for performing functions described herein. In operation, the software analyzer 108 can query information from the database 110. For example, the software analyzer 108 can query the base memory-write profile for each of the plurality of API calls to compare with the execution memory-write profile to identify the API call invoked by the execution request. The software analyzer 108 can also store information into the database 110. For example, the software analyzer 108 can generate execution memory-write profile for the API call invoked by the execution request, and store the execution memory-write profile into the database 110. The software analyzer 108 can also determine the risk level of the execution request based on the comparison result between the base memory-write profile and the execution memory-write profile and save the risk level into the database. In some cases, as illustrated in FIG. 1, the database 110 can be implemented on the same platform as the software analyzer 108. Alternatively or additionally, the database 110 can be implemented on a different hardware platform that is accessible to the software analyzer 108.

The network 106 represents an application, a set of applications, software, software modules, hardware, or any combination thereof, that can be configured to transmit data messages between the entities in the system 100. In some implementations, the software analysis platform 104 can receive the binary code of software from a software developer device (not shown) through the network 106. In some implementations, the software analysis platform 104 can transmit the analysis results to other devices, such as risk management devices (not shown) for handling the detected attacks, over the network 106. The risk management devices may communicate with the software analysis platform 104 over the network 106 for security control and system restoration.

The network 106 includes a wireless network, a wireline network, or a combination thereof. For example, the network 106 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within its coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate.

FIG. 2 is a flowchart showing an example method 200 for classifying API calls in a binary code, according to an implementation. The example method 200 can be implemented by the software analysis platform 104 shown in FIG. 1. The example method 200 shown in FIG. 2 can be implemented using additional, fewer, or different operations, which can be performed in the order shown or in a different order.

The method 200 starts at step 202 with obtaining a base memory-write profile description for the binary code. The base memory-write profile description can include a collection of base memory-write profiles for each of a plurality of API calls in the binary code. The base memory-write profile includes a count of memory updates for each of a plurality of memory locations during an execution of a corresponding API call. In some implementations, the base memory-write profile description can be pre-determined or known knowledge. In some other implementations, the base memory-write profile may be generated or refined based on feedback from the memory-write profile of a request (206). The identifiers of the plurality of API calls and their corresponding base memory-write profiles are included in the base memory-write profile description.

In some implementations, the binary code can include one or more APIs, with each API having one or more API calls that can be invoked. An API call can be invocation of a specific function included in the API. The API call can be invoked based on one or more parameters for the specific function. For example, an execution request may invoke an API call with one or more parameters.

In some implementations, for each API call, a corresponding base memory-write profile is obtained. As a result, the software analysis platform can obtain a profile description that includes the base memory-write profiles for the plurality of API calls. The base memory-write profile of an API call indicates the standard software behavior in terms of memory-write pattern during execution of the API call. The memory-write pattern is provided as one example. In some implementations, other memory access patterns, such as patterns for memory-read, memory-write, or a combination thereof, may be used to reflect the behavior of software. The memory-write profile can be the count of write operations or the count of memory updates on each location of random access memory (RAM).

In some implementations, the memory can include a plurality of memory locations or memory addresses. The memory-write profile of an API call defines, for each memory location, the number of memory updates during the execution of the API call. The base memory-write profile is corresponding to a legitimate API call that is executed with valid parameters.

In some implementations, the collection of base memory-write profiles of API calls can be obtained using one or more machine learning models. The machine learning models may use certain clustering algorithms to categorize the memory-write profiles for an API call with different parameters. For example, the same API call may be invoked with different parameters, and the corresponding memory-write profiles may be slightly different. The machine learning models can cluster such slightly different memory-write profiles as the same category, and associate them with the same API call. In some implementations, the machine learning model may aggregate such slightly different memory-write profiles and generate the standard memory-write profile for the corresponding API call, which is used as the base memory-write profile for the corresponding API call.

In some implementations, the collection of base memory-write profile can be generated with manual construction. In some other implementations, the collection of base memory-write profiles of API calls can be obtained offline or at another time. For example, the collection of base memory-write profiles may be generated by a third-party server in advance.

In some implementations, the base memory-write-profile can be obtained using a shadow memory to count the memory updates for each of the plurality of memory locations during the execution of the API calls.

At step 204, the method 200 receives an execution request that invokes the binary code. The execution request may request to invoke an API call included in the binary code. The execution request may include one or more parameters to feed into the specific function corresponding to the API call. The software analysis platform may execute the request based on invoking the binary code with the execution request without a-priori knowing which API call is invoked or the parameters.

At step 206, the method 200 generates an execution memory-write profile for the request. The execution memory-write profile includes a count of memory updates for each of the plurality of memory locations during an execution of the request.

In response to the execution request, the software analysis platform executes the request by executing the binary code with the request, resulting in an API call being invoked. The software analysis platform can monitor how many times each memory location is written into during the execution of the execution request. As a result, the software analysis platform can obtain the execution memory-write profile for the execution request.

In some implementation, the execution memory-write profile can be obtained using a shadow memory. Shadow memory is a technique used to track and store information on computer memory used by a software program during execution. In one example, in addition to allocating a segment of operation memory that is used during the execution of the binary code, the software analysis platform can allocate a segment of shadow memory. Each value of the shadow memory may correspond to one or more bits or bytes in the operation memory. Each value of the shadow memory can store a counter of the memory-writes taking place in the corresponding bits or bytes in the operation memory. For example, every time the corresponding bits or bytes in the operation memory are written during the execution, the counter in the corresponding value in the shadow memory is increased by one. Therefore, when the execution of the binary code is completed, the shadow memory can provide a count of memory-writes during the execution for each memory address in the operation memory.

At step 208, the method 200 determines, based on a comparison between the execution memory-write profile and the base memory-write profiles in the base memory-write profile description, an API call in the binary code that corresponds to the request.

Because the base memory-write profile of each API call provides information on baseline/standard software behavior for the API call, the base memory-write profiles of API calls can be used to identify an API call invoked by the execution request. Specifically, the software analysis platform can compare the execution memory-write profile with each base memory-write profile in the base memory-write description. If a match is found, for example, the similarity between the two memory-write profiles satisfies a similarity threshold, the invoked API call can be identified as the API call with the matching profile included in the base memory-write profile description.

Furthermore, the software analysis platform can determine the difference between the base memory-write profile and execution memory-write profile. For example, the software analysis platform can determine in which memory locations the counts of memory updates are different, the number of such memory locations where the count of memory updates is different, the difference of the count of the memory updates (e.g., amount of value changes) in each of such memory locations, and the sum of the differences of the count of memory updates (e.g., the sum of the amount of value changes) across such memory locations.

At step 210, the method 200 generates a notification that indicates the determined API call. The notification can further indicate a risk level of the execution request bases on a comparison between the execution memory-write profile and the base memory-write profile of the determined API call. In some implementations, the notification can include a number of memory locations where the count of memory updates is different. Alternatively or additionally, the notification can include a difference of the count of the memory updates for at least one of the plurality of memory locations.

After determining the identifier of the API call that is invoked by the execution request, the software analysis platform can generate a notification indicating the identifier of the invoked API call. In other words, the software analysis platform can indicate which API call is invoked by the execution request in the notification.

Furthermore, the software analysis platform can determine the difference between the standard software behavior in executing a legitimate API call and the actual software behavior in executing the corresponding API call invoked by the execution request. Based on the difference, a risk level of the execution request can be determined. For example, if the difference satisfies a threshold, the software analysis platform can determine that the execution request is risky. In some implementations, the risk level of the execution request is positively correlated with the risk level. For instance, a more significant difference may indicate a higher risk level. The notification can include the information on the risk level of the execution request. Furthermore, the notification can include the comparison results of the amount of changes, including the amount of location changes, or the amount of value changes, or both. For example, the notification can include the number of memory locations (e.g., amount of locations changes) where the count of memory updates is different, and the difference of the count of memory updates (e.g., amount of value changes) for at least one of the plurality of memory locations, or both. In some implementations, the comparison result can be the maximum value of change amount, the minimum value of change amount, the mean of change amount, the median of change amount, or any other statistical representations of the change amount.

In some cases, the notification can be provided to one or more other risk management devices or tools, such as an intrusion detection or triage tool, for further analysis. Alternatively or additionally, the software analysis platform can return a response to the software developer device indicating the detected attacks from execution requests. In some cases, subsequent processes can be implemented to minimize the risk of attacks. For example, the software developer may design a more robust system based on the information of the detected attacks. In some cases, even if the execution request has caused damages, the risk management devices or tools can use the determined identifier of the API call, and the execution memory-write profile to better locate the damages, and restore the system more efficiently. As a result, the techniques described herein can detect attacks and minimize the potential damages caused by safety and security attacks.

FIG. 3 illustrates a high level architecture block diagram of a computer 300 according to an implementation. The computer 300 can be implemented as the software analysis platform 104 of FIG. 1. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The computer 300 includes a computing system configured to establish a secured code package for a browser plugin and generate a message communication when executing the plugin in the browser. In some cases, the computer 300 may include a computing system implementing processes and methods disclosed in FIG. 2. In some cases, the processing algorithm of the code package establishment can be implemented in an executable computing code, e.g., C/C++ executable codes. In some cases, the computer 300 can include a standalone Linux system that runs batch applications. In some cases, the computer 300 can include mobile or personal computers.

The computer 300 may comprise a computer that includes an input device, such as a keypad, keyboard, touch screen, microphone, speech recognition device, other device that can accept user information, and/or an output device that conveys information associated with the operation of the computer, including digital data, visual and/or audio information, or a GUI.

The computer 300 can serve as a client, network component, a server, a database or other persistency, and/or any other components. In some implementations, one or more components of the computer 300 may be configured to operate within a cloud-computing-based environment.

At a high level, the computer 300 is an electronic computing device operable to receive, transmit, process, store, or manage data. According to some implementations, the computer 300 can also include or be communicably coupled with an application server, e-mail server, web server, caching server, streaming data server, business intelligence (BI) server, and/or other server.

The computer 300 can collect data of network events or mobile application usage events over network 140 from a web browser 130 or a client application, e.g., an installed plugin. In addition, data can be collected by the computer 300 from internal users (e.g., from a command console or by another appropriate access method), external or third parties, other automated applications, as well as any other appropriate entities, individuals, systems, or computers.

Each of the components of the computer 300 can communicate using a system bus 312. In some implementations, any and/or all the components of the computer 300, both hardware and/or software, may interface with each other and/or the interface 302 over the system bus 312 using an application programming interface (API) 308 and/or a service layer 310. The API 308 may include specifications for routines, data structures, and object classes. The API 308 may be either computer language-independent or -dependent and refer to a complete interface, a single function, or even a set of APIs. The service layer 310 provides software services to the computer 300. The functionality of the computer 300 may be accessible for all service consumers using this service layer. Software services, such as those provided by the service layer 310, provide reusable, defined business functionalities through a defined interface. For example, the interface may be software written in JAVA, C++, or other suitable languages providing data in Extensible Markup Language (XML) format or other suitable format. While illustrated as an integrated component of the computers 300, alternative implementations may illustrate the API 308 and/or the service layer 310 as stand-alone components in relation to other components of the computer 300. Moreover, any or all parts of the API 308 and/or the service layer 310 may be implemented as child or sub-modules of another software module, enterprise application, or hardware module without departing from the scope of this disclosure.

The computer 300 includes an interface 302. Although illustrated as a single interface 302 in FIG. 3, two or more interfaces 302 may be used according to particular needs, desires, or particular implementations of the computer 300. The interface 302 is used by the computer 300 for communicating with other systems in a distributed environment connected to a network (whether illustrated or not). Generally, the interface 302 comprises logic encoded in software and/or hardware in a suitable combination and operable to communicate with the network. More specifically, the interface 302 may comprise software supporting one or more communication protocols associated with communications such that the network or interface's hardware is operable to communicate physical signals within and outside of the computer 300.

The computer 300 includes at least one processor 304. Although illustrated as a single processor 304 in FIG. 3, two or more processors may be used according to particular needs, desires, or particular implementations of the computer. Generally, the processor 304 executes instructions and manipulates data to perform the operations of the computer 300. Specifically, the processor 304 executes the functionality required for establishing a described code package disclosed in FIGS. 1 to 3.

The computer 300 also includes a memory 314 that holds data for the computer 300. Although illustrated as a single memory 314 in FIG. 3, two or more memories may be used according to particular needs, desires, or particular implementations of the computer 300. While memory 314 is illustrated as an integral component of the computer 300, in alternative implementations, memory 314 can be external to the computer 300.

The application 306 is an algorithmic software engine providing functionality according to particular needs, desires, or particular implementations of the computer 300, particularly with respect to functionality required for anomaly detection. Although illustrated as a single application 306, the application 306 may be implemented as multiple applications 306 on the computer 300. In addition, although illustrated as integral to the computer 300, in alternative implementations, the application 306 can be external to the computer 300.

There may be any number of computers 300 associated with, or external to, and communicating over a network. Further, this disclosure contemplates that many users may use one computer 300, or that one user may use multiple computers 300.

Described implementations of the subject matter can include one or more features, alone or in combination.

For example, in a first implementation, a method, comprising: obtaining a base memory-write profile description for a binary code, wherein the base memory-write profile description comprises: a base memory-write profile for each of a plurality of Application Programming Interface (API) calls in the binary code, wherein the base memory-write profile comprises a count of memory updates for each of a plurality of memory locations during an execution of a corresponding API call; receiving an execution request that invokes the binary code; generating an execution memory-write profile for the execution request, wherein the execution memory-write profile comprises a count of memory updates for each of the plurality of memory locations during an execution of the execution request; determining, based on a comparison between the execution memory-write profile and the base memory-write profiles in the base memory-write profile description, an API call in the binary code that corresponds to the execution request; and generating a notification that indicates the determined API call.

The foregoing and other described implementations can each, optionally, include one or more of the following features:

A first feature, combinable with any of the following features, wherein the notification further indicates a risk level of the execution request based on a comparison between the execution memory-write profile and the base memory-write profile of the determined API call.

A second feature, combinable with any of the following features, wherein the risk level is positively correlated with a difference between the execution memory-write profile and the base memory-write profile of the determined API call.

A third feature, combinable with any of the following features, wherein the execution memory-write profile is generated by using a shadow memory to count the memory updates for each of the plurality of memory locations.

A fourth feature, combinable with any of the following features, wherein the notification comprises a number of memory locations where the count of memory updates is different.

A fifth feature, combinable with any of the following features, wherein the notification comprises a difference of the count of memory updates for at least one of the plurality of memory locations.

A sixth feature, combinable with any of the following features, wherein the base memory-write profile for each of the plurality of API calls is obtained using one or more machine learning models.

In a second implementation, a computer-readable medium containing instructions which, when executed, cause a computing device to perform operations comprising: obtaining a base memory-write profile description for a binary code, wherein the base memory-write profile description comprises: a base memory-write profile for each of a plurality of Application Programming Interface (API) calls in the binary code, wherein the base memory-write profile comprises a count of memory updates for each of a plurality of memory locations during an execution of a corresponding API call; receiving an execution request that invokes the binary code; generating an execution memory-write profile for the execution request, wherein the execution memory-write profile comprises a count of memory updates for each of the plurality of memory locations during an execution of the execution request; determining, based on a comparison between the execution memory-write profile and the base memory-write profiles in the base memory-write profile description, an API call in the binary code that corresponds to the execution request; and generating a notification that indicates the determined API call.

The foregoing and other described implementations can each, optionally, include one or more of the following features:

A first feature, combinable with any of the following features, wherein the notification further indicates a risk level of the execution request based on a comparison between the execution memory-write profile and the base memory-write profile of the determined API call.

A second feature, combinable with any of the following features, wherein the risk level is positively correlated with a difference between the execution memory-write profile and the base memory-write profile of the determined API call.

A third feature, combinable with any of the following features, wherein the execution memory-write profile is generated by using a shadow memory to count the memory updates for each of the plurality of memory locations.

A fourth feature, combinable with any of the following features, wherein the notification comprises a number of memory locations where the count of memory updates is different.

A fifth feature, combinable with any of the following features, wherein the notification comprises a difference of the count of memory updates for at least one of the plurality of memory locations.

A sixth feature, combinable with any of the following features, wherein the base memory-write profile for each of the plurality of API calls is obtained using one or more machine learning models.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: obtaining a base memory-write profile description for a binary code, wherein the base memory-write profile description comprises: a base memory-write profile for each of a plurality of Application Programming Interface (API) calls in the binary code, wherein the base memory-write profile comprises a count of memory updates for each of a plurality of memory locations during an execution of a corresponding API call; receiving an execution request that invokes the binary code; generating an execution memory-write profile for the execution request, wherein the execution memory-write profile comprises a count of memory updates for each of the plurality of memory locations during an execution of the execution request; determining, based on a comparison between the execution memory-write profile and the base memory-write profiles in the base memory-write profile description, an API call in the binary code that corresponds to the execution request; and generating a notification that indicates the determined API call.

The foregoing and other described implementations can each, optionally, include one or more of the following features:

A first feature, combinable with any of the following features, wherein the notification further indicates a risk level of the execution request based on a comparison between the execution memory-write profile and the base memory-write profile of the determined API call.

A second feature, combinable with any of the following features, wherein the risk level is positively correlated with a difference between the execution memory-write profile and the base memory-write profile of the determined API call.

A third feature, combinable with any of the following features, wherein the execution memory-write profile is generated by using a shadow memory to count the memory updates for each of the plurality of memory locations.

A fourth feature, combinable with any of the following features, wherein the notification comprises a number of memory locations where the count of memory updates is different.

A fifth feature, combinable with any of the following features, wherein the notification comprises a difference of the count of memory updates for at least one of the plurality of memory locations.

A sixth feature, combinable with any of the following features, wherein the base memory-write profile for each of the plurality of API calls is obtained using one or more machine learning models.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatus with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a ROM or a RAM or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a PDA, a mobile audio or video player, a game console, a GPS receiver, or a portable storage device, e.g., a USB flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD, LED, or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a WLAN using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship with each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable formats. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

The invention claimed is:

1. A computer-implemented method comprising:
   obtaining a base memory-write profile description for a binary code, wherein the base memory-write profile description comprises: a base memory-write profile for each of a plurality of Application Programming Interface (API) calls in the binary code, wherein the base memory-write profile comprises a count of memory updates for each of a plurality of memory locations during an execution of a corresponding API call;
   receiving an execution request that invokes the binary code;
   generating an execution memory-write profile for the execution request, wherein the execution memory-write profile comprises a count of memory updates for each of the plurality of memory locations during an execution of the execution request;
   identifying, based on a comparison between the execution memory-write profile and the base memory-write profiles in the base memory-write profile description, wherein the comparison between the execution memory-write profile and the base memory-write profiles comprises a comparison between a count of memory updates to a particular memory location in the base memory-write profile with a count of memory updates to the same particular memory location in the base memory-write profiles, an API call in the binary code that corresponds to the execution request; and
   generating a notification that indicates the identified API call, wherein the notification further indicates a risk level of the execution request based on a comparison between the execution memory-write profile and the base memory-write profile of the identified API call.

2. The computer-implemented method of claim 1, wherein the risk level is positively correlated with a difference between the execution memory-write profile and the base memory-write profile of the identified API call.

3. The computer-implemented method of claim 1, wherein the execution memory-write profile is generated by using a shadow memory to count the memory updates for each of the plurality of memory locations.

4. The computer-implemented method of claim 1, wherein the notification comprises a number of memory locations where the count of memory updates is different.

5. The computer-implemented method of claim 1, wherein the notification comprises a difference of the count of memory updates for at least one of the plurality of memory locations.

6. The computer-implemented method of claim 1, wherein the base memory-write profile for each of the plurality of API calls is obtained using one or more machine learning models.

7. A non-transitory computer-readable medium containing instructions which, when executed, cause a computing device to perform operations comprising:
   obtaining a base memory-write profile description for a binary code, wherein the base memory-write profile description comprises: a base memory-write profile for each of a plurality of Application Programming Interface (API) calls in the binary code, wherein the base memory-write profile comprises a count of memory updates for each of a plurality of memory locations during an execution of a corresponding API call;
   receiving an execution request that invokes the binary code;
   generating an execution memory-write profile for the execution request, wherein the execution memory-write profile comprises a count of memory updates for each of the plurality of memory locations during an execution of the execution request;
   identifying, based on a comparison between the execution memory-write profile and the base memory-write profiles in the base memory-write profile description, wherein the comparison between the execution memory-write profile and the base memory-write profiles comprises a comparison between a count of memory updates to a particular memory location in the base memory-write profile with a count of memory updates to the same particular memory location in the base memory-write profiles, an API call in the binary code that corresponds to the execution request; and
   generating a notification that indicates the identified API call, wherein the notification further indicates a risk level of the execution request based on a comparison between the execution memory-write profile and the base memory-write profile of the identified API call.

8. The computer-readable medium of claim 7, wherein the risk level is positively correlated with a difference between the execution memory-write profile and the base memory-write profile of the identified API call.

9. The computer-readable medium of claim 7, wherein the execution memory-write profile is generated by using a shadow memory to count the memory updates for each of the plurality of memory locations.

10. The computer-readable medium of claim 7, wherein the notification comprises a number of memory locations where the count of memory updates is different.

11. The computer-readable medium of claim 7, wherein the notification comprises a difference of the count of memory updates for at least one of the plurality of memory locations.

12. The computer-readable medium of claim 7, wherein the base memory-write profile for each of the plurality of API calls is obtained using one or more machine learning models.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining a base memory-write profile description for a binary code, wherein the base memory-write profile description comprises: a base memory-write profile for each of a plurality of Application Programming Interface (API) calls in the binary code, wherein the base memory-write profile comprises a count of memory updates for each of a plurality of memory locations during an execution of a corresponding API call;
receiving an execution request that invokes the binary code;
generating an execution memory-write profile for the execution request, wherein the execution memory-write profile comprises a count of memory updates for each of the plurality of memory locations during an execution of the execution request;
identifying, based on a comparison between the execution memory-write profile and the base memory-write profiles in the base memory-write profile description, wherein the comparison between the execution memory-write profile and the base memory-write profiles comprises a comparison between a count of memory updates to a particular memory location in the base memory-write profile with a count of memory updates to the same particular memory location in the base memory-write profiles, an API call in the binary code that corresponds to the execution request; and
generating a notification that indicates the identified API call, wherein the notification further indicates a risk level of the execution request based on a comparison between the execution memory-write profile and the base memory-write profile of the identified API call.

14. The computer-implemented system of claim 13, wherein the risk level is positively correlated with a difference between the execution memory-write profile and the base memory-write profile of the identified API call.

15. The computer-implemented system of claim 13, wherein the execution memory-write profile is generated by using a shadow memory to count the memory updates for each of the plurality of memory locations.

16. The computer-implemented system of claim 13, wherein the notification comprises a number of memory locations where the count of memory updates is different.

17. The computer-implemented system of claim 13, wherein the notification comprises a difference of the count of memory updates for at least one of the plurality of memory locations.

* * * * *